(12) United States Patent
Goodman et al.

(10) Patent No.: US 6,834,347 B2
(45) Date of Patent: Dec. 21, 2004

(54) TARGET SELF-SECURITY FOR UPGRADES FOR AN EMBEDDED DEVICE

(75) Inventors: Brian Gerard Goodman, Tucson, AZ (US); Mark Edward Hill, Tucson, AZ (US); Glen Alan Jaquette, Tucson, AZ (US); Toshiyuki Shiratori, Komae (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/425,967

(22) Filed: Apr. 29, 2003

(65) Prior Publication Data

US 2004/0230815 A1 Nov. 18, 2004

(51) Int. Cl.[7] .................. G06F 11/30; G06F 12/14; H04L 9/32
(52) U.S. Cl. .................. 713/191; 713/155; 713/168; 713/187; 713/201; 380/30; 714/38
(58) Field of Search .................. 713/191, 155, 713/168, 181, 187, 192, 200, 201, 202; 380/30, 59; 705/56, 63, 76; 714/38

(56) References Cited

U.S. PATENT DOCUMENTS

| | | | | |
|---|---|---|---|---|
| 5,715,390 A | * | 2/1998 | Hoffman et al. ............ | 713/202 |
| 5,771,287 A | * | 6/1998 | Gilley et al. ................ | 713/191 |
| 5,774,551 A | * | 6/1998 | Wu et al. .................... | 713/155 |
| 5,844,986 A | * | 12/1998 | Davis .......................... | 713/187 |
| 6,009,177 A | | 12/1999 | Sudia .......................... | 380/25 |
| 6,212,635 B1 | * | 4/2001 | Reardon ...................... | 713/165 |

FOREIGN PATENT DOCUMENTS

| | | | | |
|---|---|---|---|---|
| WO | WO0104749 A1 | 1/2001 | ........... | G06F/9/445 |
| WO | WO0163387 A2 | 8/2001 | | |
| WO | WO0195100 A1 | 12/2001 | | |

* cited by examiner

*Primary Examiner*—Emmanuel L. Moise
(74) *Attorney, Agent, or Firm*—John H. Holcombe

(57) ABSTRACT

Authentication of an upgrade to computer readable program code of a target embedded device is accomplished by causing the computer processor of the embedded device to access an unique machine identifier; to access an identifier key associated with the upgrade; to process the identifier key and/or unique machine identifier, such as by decrypting the key and/or encrypting the identifier; to compare the identifier key with the unique machine identifier; and causing the computer processor, if the identifier key matches the unique machine identifier, to enable the upgrade; else, to fail the upgrade.

33 Claims, 13 Drawing Sheets

111

| Unique Machine Identifier |
|---|

| Identifier Key |
|---|

FIG. 3

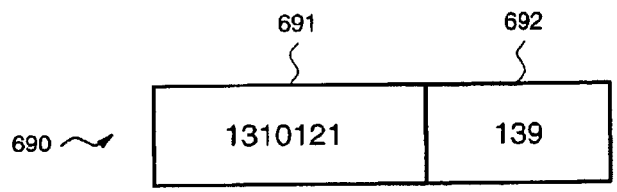
FIG. 19
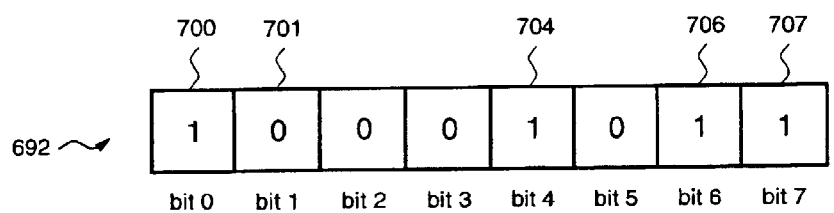
FIG. 20
| | |
|---|---|
| bit 0 | 1310121 |
| bit 4 | 1310125 |
| bit 6 | 1310127 |
| bit 7 | 1310128 |
FIG. 21
| | |
|---|---|
| | 1310121 |
| bit 0 | 1310122 |
| bit 4 | 1310126 |
| bit 6 | 1310128 |
| bit 7 | 1310129 |
FIG. 22

TARGET SELF-SECURITY FOR UPGRADES FOR AN EMBEDDED DEVICE

FIELD OF THE INVENTION

This invention relates to embedded devices, for example, which comprise a computer processor, at least one element operated by the computer processor, and a memory storing computer readable program code for operating the computer processor. More particularly, the present invention relates to the provision of upgrades for an embedded device.

BACKGROUND OF THE INVENTION

Computer processor control in embedded devices allows a level of flexibility to the embedded devices which can reduce costs while improving product quality. Examples of embedded systems which provide a unique function or service and which contain at least one microprocessor may comprise modems, answering machines, automobile controls, data storage disk drives, data storage tape drives, digital cameras, medical drug infusion systems, storage automation products, etc.

Upgrades for embedded devices offer the possibility of generating revenue for the supplier, and more functionality and product longevity for the customer. In many instances, the upgrades are provided by an upgrade to the computer readable program code for operating the computer processor, often called "firmware", and do not require any change or addition to the hardware to implement. For example, after the popular 56K modem technology was introduced, any modem manufacturers provided firmware updates to existing customers. The updates allowed some existing modems to support the new technology for increased communication speeds. As another example, the IBM 3584 Ultra Scalable Tape Library was provided with a plurality of embedded devices of a system, and enhancements have been made, such as a web interface. With many systems, customers have an expectation that their systems can be updated for many years into the future. Additionally, customers may wish to start at an initial level of operation of an embedded device, with the possibility of upgrading in the future.

With purchased products, control is required to insure that updates and upgrades (herein both are called "upgrades") are provided only to those machines for which the upgrade has been paid for. Upgrades may additionally comprise fixes to problems with the machine or system. A maintenance agreement may be used to supply fixes for compensation. If the upgrade is provided to the user in the form of an update, it may be possible for the user to pay for one upgrade and load the upgrade file into a number of machines. One approach to counter this involves a special firmware update file for each machine to be upgraded, for example, by identifying the serial number of the machine to be upgraded. This approach becomes complicated if separate update files are required for hundreds or thousands of machines. In addition, circumventing this check may be possible by hacking a change in the machine serial number. Another approach is to use a product registration key which is entered at a user interface. This approach is common for a PC software installation. However, embedded devices often do not have the necessary user interface to implement this solution effectively, and the user may inappropriately install the software in additional machines.

SUMMARY OF THE INVENTION

The present invention comprises an embedded device, a method, and a computer program product for an embedded device. The embedded device comprises a computer processor, at least one element operated by the computer processor, and a memory storing computer readable program code for operating the computer processor. The memory may comprise a part of or be separate from, the computer processor, and may comprise one or a plurality of memories.

In one embodiment, computer readable program code authenticates an upgrade to the computer readable program code of the target embedded device. The computer readable program code causes the computer processor to access an unique machine identifier; causes the computer processor to access an identifier key associated with the upgrade; causes the computer processor to process the identifier key and/or the unique machine identifier; causes the computer processor to compare the processed identifier key with the processed unique machine identifier in the same process space; and causes the computer processor, if the processed identifier key matches the processed unique machine identifier, to enable the upgrade; else, to fail the upgrade. In one example, an encrypted identifier key is processed by decrypting, and the comparison conducted in the same unencrypted process space. In another example, the unique machine identifier is processed by encrypting, and compared to an encrypted identifier in the same encrypted process space.

Thus, the target embedded device self-authenticates the upgrade, providing self-security for the upgrade.

In a further embodiment, the computer readable program code enables the upgrade, causing the computer processor to set an enabling flag for the upgrade.

In another embodiment, wherein the computer processor is responsive to a power-on and/or reset to initiate the upgrade authentication, the computer readable program code enables the upgrade, causing the computer processor, if the processed identifier key matches the processed unique machine identifier, to initialize the embedded device normally with the upgrade enabled; else, to initialize the embedded device in degraded form.

In still another embodiment, wherein the embedded device comprises an input, the computer readable program code additionally causes the computer processor to respond to an upgrade command received at the input, and initiate the upgrade authentication.

In a further embodiment, the computer readable code additionally causes the computer processor, if the processed identifier key fails to match the processed unique machine identifier, to conduct at least one error recovery procedure on the unique machine identifier and/or identifier key; to again compare the processed identifier key with the processed unique machine identifier; and, if the processed identifier key matches the processed unique machine identifier, to enable the upgrade; else, to fail the upgrade.

In another embodiment, the computer processor accesses an upgrade key associated with an identified upgrade. Computer readable program code causes the computer processor to process the upgrade key; to compare the processed upgrade key with the processed unique machine identifier; and causes the computer processor, if the processed upgrade key matches the processed unique machine identifier, to enable the identified upgrade; else, to fail the identified upgrade.

Further, in another embodiment, wherein the upgrade key comprises a code key and a machine identifier, the computer readable program code causes the computer processor to process the code key; and causes the computer processor to compare the processed code key with the machine identifier and/or with the processed unique machine identifier.

In still another embodiment, wherein the upgrade key comprises a plurality of upgrade machine identifiers, the computer readable program code causes the computer processor to process the plurality of upgrade machine identifiers; and causes the computer processor to compare the processed plurality of upgrade machine identifiers with the processed unique machine identifier, the comparison indicated as matched if the processed unique machine identifier is within a range between the processed plurality of upgrade machine identifiers.

Where the embodiment of the upgrade key comprises an upgrade machine identifier and a count, the computer readable program code causes the computer processor to process the upgrade machine identifier and the count; and causes the computer processor to compare the processed upgrade machine identifier and the count with the processed unique machine identifier, the comparison indicated as matched if the processed unique machine identifier is within a range between the processed upgrade machine identifier and a sum of the processed upgrade machine identifier and the count.

In a further embodiment, wherein the upgrade key comprises an upgrade machine identifier and a qualifier, the computer readable program code causes the computer processor to process the upgrade machine identifier and the qualifier; and causes the computer processor to compare the processed upgrade machine identifier and the qualifier with the processed unique machine identifier, the comparison-indicated as matched if the processed unique machine identifier matches the processed upgrade machine identifier combined with the qualifier.

For a fuller understanding of the present invention, reference should be made to the following detailed description taken in conjunction with the accompanying drawings.

BRIEF DESCRIPTION OF THE DRAWINGS

FIG. 2 is a diagrammatic illustration of an embodiment of an unique machine identifier in accordance with the present invention;

FIG. 3 is a diagrammatic illustration of an embodiment of an identifier key in accordance with the present invention;

FIG. 19 is a diagrammatic illustration of an example of an upgrade key of FIG. 11 with an upgrade machine identifier and a qualifier;

FIG. 20 is a diagrammatic illustration of an embodiment of the upgrade key qualifier of FIG. 19; and FIGS. 21 and 22 are diagrammatic illustrations of alternative embodiments of details of the upgrade key qualifier of FIG. 20.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
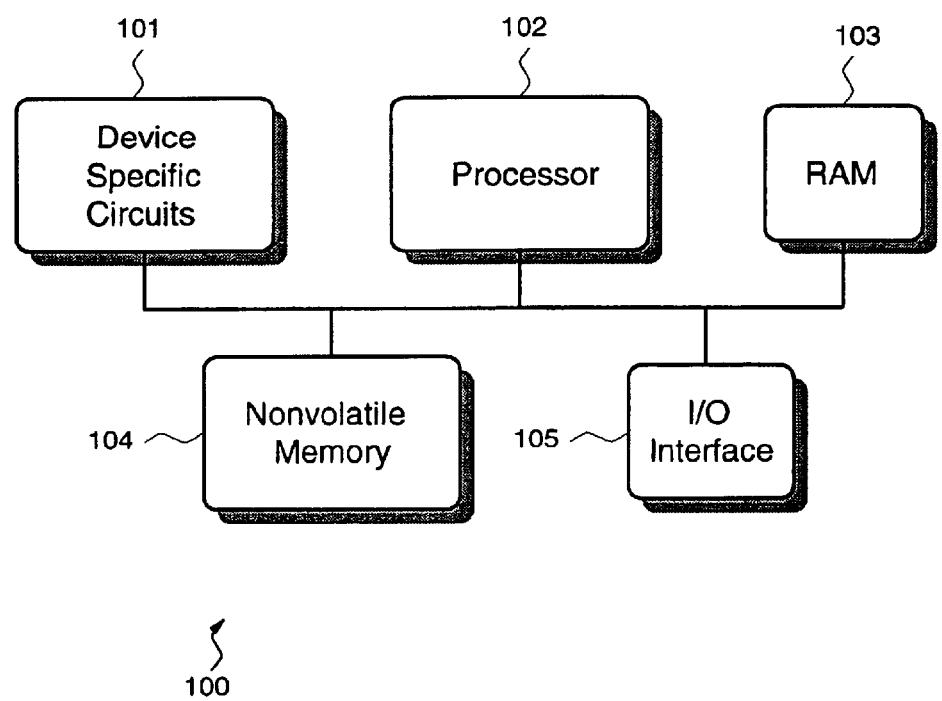
FIG. 1 is a block diagrammatic illustration of an embedded device which implements the present invention.

Referring to FIG. 1, an example of an embedded device 100 is illustrated, such as an embedded device which implements specialized functions or service. Examples of embedded devices are modems, answering machines, automobile controls, disk drives, tape drives, digital cameras, medical drug infusion systems, and storage automation products to control accessors or provide communications. The embedded device is illustrated with a computer processor 102, optional RAM (Random Access Memory) 103, a rewritable nonvolatile memory 104, device specific circuits 101 and an I/O interface 105, any or all of which may comprise "elements" of the embedded device 100. The computer processor 102 may be an off-the-shelf microprocessor, custom processor, discrete logic, a digital signal processor (DSP), a hardware state machine, combinatorial logic, etc., or conducted by a combination of such devices, and computer readable program code may be software code, firmware code, hardwired or combinatorial logic, etc., or a combination, as are known to those of skill in the art. The rewritable nonvolatile memory 104 is used to hold nonvolatile data for the embedded system 100, and may comprise a flash PROM (Programmable Read-Only Memory), battery backup RAM, and other of many types of nonvolatile memory are also known to those of skill in the art. The processor 102 may alternatively maintain the executable firmware in an internal memory. The I/O interface 105 is some form of communication interface that allows the computer processor 102 to communicate with the outside world. Examples may include serial interfaces, SCSI (Small Computer Systems Interface), Ethernet, Fibre Channel interfaces, etc. The device specific circuits 101 provide additional hardware to enable an embedded system 100 to perform specific functions such as actuator control of a vehicle anti-lock braking system, motor control of an accessor for an automated data storage library, etc. The device specific circuits 101 may comprise electronics that provide Pulse Width Modulation (PWM) control, Analog to Digital Conversion (ADC), Digital to Analog Conversion (DAC), Liquid Crystal Display (LCD) controller, etc. Any of the elements of FIG. 1 may be combined into one or more components, for example, the nonvolatile memory 104, RAM 103, and/or P/O interface 105 may comprise components of the processor 102.

As discussed above, many upgrades to the firmware may be provided by an upgrade to the computer readable program code for operating the computer processor, and may not require any change or addition to the hardware to implement. The upgrades may be provided to the firmware in advance, and subsequently enabled by an external signal, or the upgrades may be provided by transfer to the embedded device 100, e.g., through the I/O interface 105. The upgrade computer readable program code may be stored in nonvolatile memory 104, or in RAM 103, or the memory may comprise a part of or be separate from, the computer processor, and may comprise one or a plurality of memories.

Referring additionally to FIG. 2, in one embodiment, the target embedded device comprises an unique machine identifier 111. The unique machine identifier is an identifier that is associated with the embedded device 100 such that it is unique from other similar devices. The unique machine identifier may comprise a component serial number, a product serial number, a product security key, an Ethernet MAC (Medium Access Control) address, a Fibre Channel world wide name, or any other unique information that is associated with the embedded device 100 or a component. An example of unique information associated with a component comprises a battery backup nonvolatile memory of Dallas Semiconductor Co. that has a fixed world wide unique identifier. Thus, the unique machine identifier may be fixed, or, if in nonvolatile memory, may be changeable from one unique identifier to another.

Referring additionally to FIG. 3, in accordance with one embodiment of the present invention, an identifier key 120 is provided to authenticate an upgrade to the computer readable program code of the target embedded device. The identifier key 120 is encrypted or provided in some manner known to the embedded device, such that the embedded device may authenticate the upgrade. The term "upgrade" is employed in the generic sense to indicate a change to the computer readable program code for the processor, and examples comprise an upgrading to the function of the embedded device, such as enabling a feature, comprise an update to an existing function, comprise a downgrade to the function of the embedded device, comprise a fix to the function of the embedded device, or comprise a compatibility change without a change in function, or a combination. Those of skill in the art understand that other "upgrades" can be envisioned.

The encryption of the identifier key 120 may be as simple as the compliment of each byte of the unique machine identifier 111, or may be more complicated, such as employing a translation or an encryption algorithm. Many methods of encryption are known to those of skill in the art and some provide one way encryption. For example, a one-way hashing algorithm may be applied to the unique machine identifier 111, and the identifier key 120 may comprise the results of this one-way hashing. A one-way hashing algorithm refers to an algorithm that only works in one direction such that there is no way to go from a hashed value to an original value. In this case, the hashing algorithm is applied to the unique machine identifier 111 since the identifier key 120 cannot be reverse hashed, such that the comparison occurs in encrypted space. Herein, any decryption and/or encryption algorithms against the unique machine identifier and/or the identifier key shall be referred to as "processing" them. Further, either may be "processed" by leaving it unchanged, so long as both are processed into the same process space relative to encryption. In addition, any comparison between a processed identifier key and the processed unique machine identifier shall refer to a comparison after any decryption and/or encryption algorithms have been applied. Alternatively, public-private keys may be employed to accomplish the encryption/decryption of the identifier key 120 and/or unique machine identifier 111, such that the comparison occurs wholly or partially in encrypted space. Still alternatively, the encryption may be a duplicate of the unique machine identifier 111, addressed in such a way that it is not readily available to a potential user of the embedded device. If the unique machine identifier 111 is maintained in a nonvolatile memory of the embedded device 100, a purpose of the identifier key 120 may be to prevent accidental or unauthorized overwrite of the unique machine identifier, as will be discussed. The identifier key 120 may be maintained in a nonvolatile memory to authenticate the upgrade, for example, each time that the embedded device is powered on or reset. Alternatively, the identifier key 120 may be supplied with a command to activate the upgrade, or a validity check command, and need not be maintained in a nonvolatile memory.

Additionally, when used for the purpose of authenticating an upgrade, the identifier key 120 prevents unauthorized upgrading of the embedded device 100.

Figure 4:
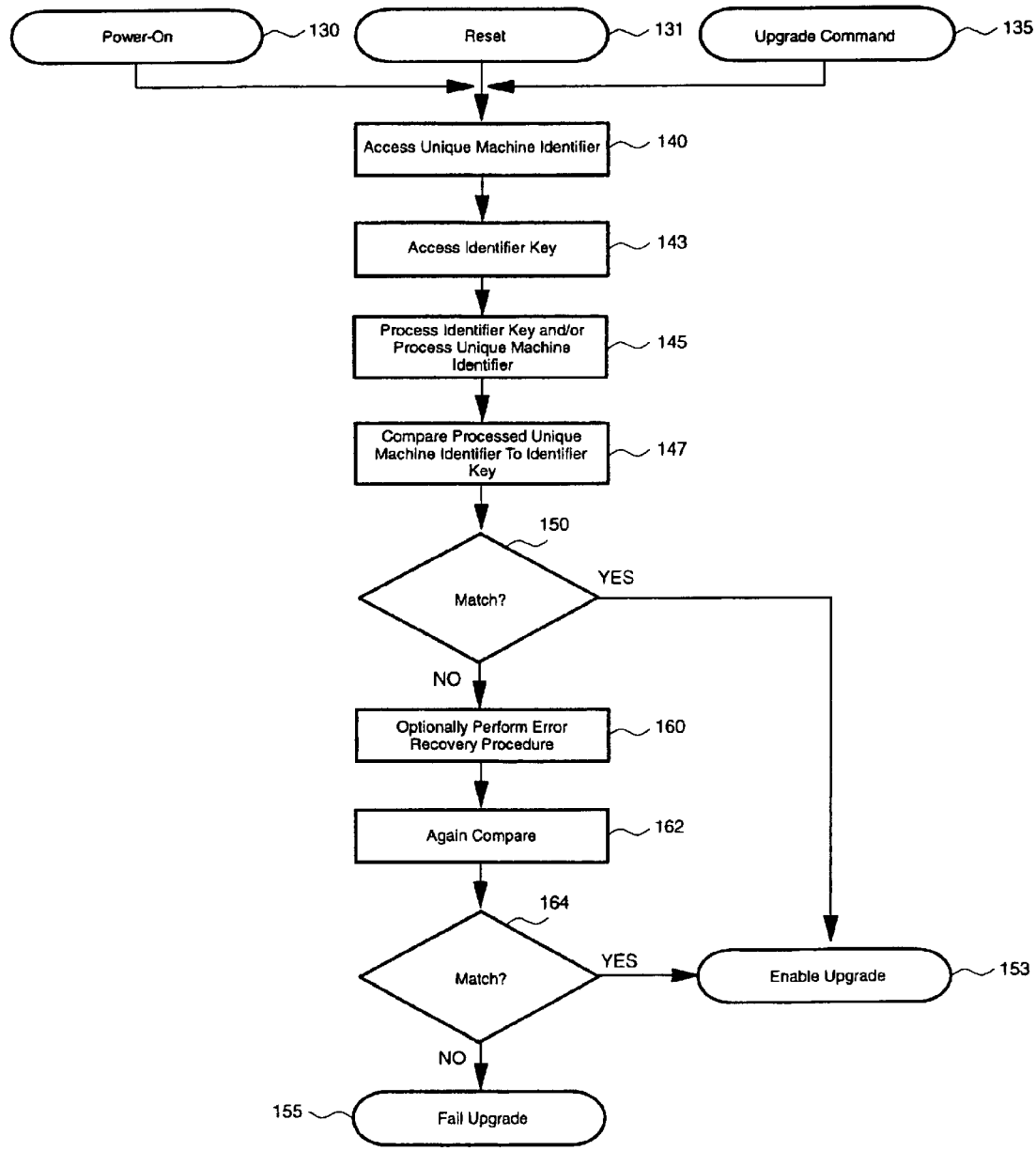
FIG. 4 is a flow chart depicting an embodiment of the present invention for authenticating an upgrade to the computer readable program code of the target embedded device of FIG. 1.

Referring additionally to FIG. 4, the authentication of an upgrade in accordance with the present invention may be initiated by any or all of a power-on 130 of the target embedded device 100, a hardware or software reset 131, internally or externally initiated, of the target embedded device, or by an upgrade command 135. The upgrade command may comprise a firmware update or one or more commands communicated to the embedded device 100, for example, at the r/o interface 105. Alternatively, the upgrade command 135 may comprise a firmware update where the firmware update contains the identifier key 120, and a subsequent power-on 130 or reset 131 would execute the function of FIG. 4.

In step 140, computer readable program code of the target embedded device 100 causes the computer processor 102 to access the unique machine identifier 111; and in step 143, causes the computer processor to access an identifier key 120 associated with the upgrade. The computer readable program code of the embedded device 100 causes the computer processor 102, in step 145, to process the identifier key 120 and/or the accessed unique machine identifier 111, and causes the computer processor to, in step 147, compare the processed identifier key with the processed unique machine identifier 111. If, in step 150, the computer processor determines that the processed identifier key matches the processed unique machine identifier, as will be discussed, then, in step 153, the computer processor enables the upgrade. Further to the above discussion, "processing" comprises the target embedded device decrypting an accessed encrypted identifier key 120 and leaving an unencrypted accessed unique machine identifier 111 unchanged so that the comparison is conducted in the same unencrypted process space; or leaving an encrypted identifier key 120 unchanged and encrypting an unencrypted accessed unique machine identifier 111 so that the comparison is conducted in the same encrypted process space; or the opposite of the above for an unencrypted identifier key 120; or any combination, such as the use of public and private keys; all so that both the processed identifier key 120 and processed unique machine identifier 111 are in the same process space for comparison.

In a further embodiment, the computer readable program code of the embedded device 100 causes the computer processor 102, in step 153, to enable the upgrade by setting an enabling flag for the upgrade. Alternatively, or additionally, the upgrade may be enabled by storing the identifier key for processing again at power-on 130 or reset 131. In another embodiment, wherein the computer processor is responsive to a power-on 130 and/or reset 131 to initiate the upgrade authentication, the computer readable program code enables the upgrade, causing the computer processor, if the processed identifier key matches the processed unique machine identifier in step 150, to initialize the embedded device normally with the upgrade enabled; else, to fail the upgrade.

If step 150 of FIG. 4 indicates that the processed identifier key does not match the processed unique machine identifier, the upgrade may be directly failed, for example, in step 155.

In an alternative embodiment, the computer readable code additionally causes the computer processor, if the processed identifier key fails to match the processed unique machine identifier, to conduct, in step 160, at least one error recovery procedure (ERP) on the unique machine identifier and/or identifier key. This may be accomplished with a cyclic redundancy check (CRC) or some other form of error correction, or some other error recovery procedure, as are known to those of skill in the art. In step 162, the computer readable code causes the computer processor to again compare the processed identifier key with the processed unique machine identifier; and, if, in step 164, the comparison indicates that the processed identifier key matches the processed unique machine identifier, to, in step 153, enable the upgrade; else, in step 155, to fail the upgrade.

If the upgrade has failed, in one example, the computer readable code may initialize the embedded device in degraded form. The embedded device 100 of FIG. 1 may operate in a state without the upgrades or features enabled. This may be in the prior state of operation, without any degradation from that of the prior state. As another example, if the upgrade fails from a power-on 130 or a reset 131, the validity of the unique machine identifier cannot be confirmed, and the upgrades may be assumed to be not installed or not paid for. Thus, the embedded device may operate at some minimum level until the corruption and possible tampering have been corrected. In yet another example, a failure to upgrade may result in the embedded system becoming inoperable until the unique machine identifier and/or the identifier key have been corrected. Still further, a failure to upgrade may result in no action whatsoever.

Thus, the target embedded device self-authenticates the upgrade, providing self-security for the upgrade.

Figure 5:
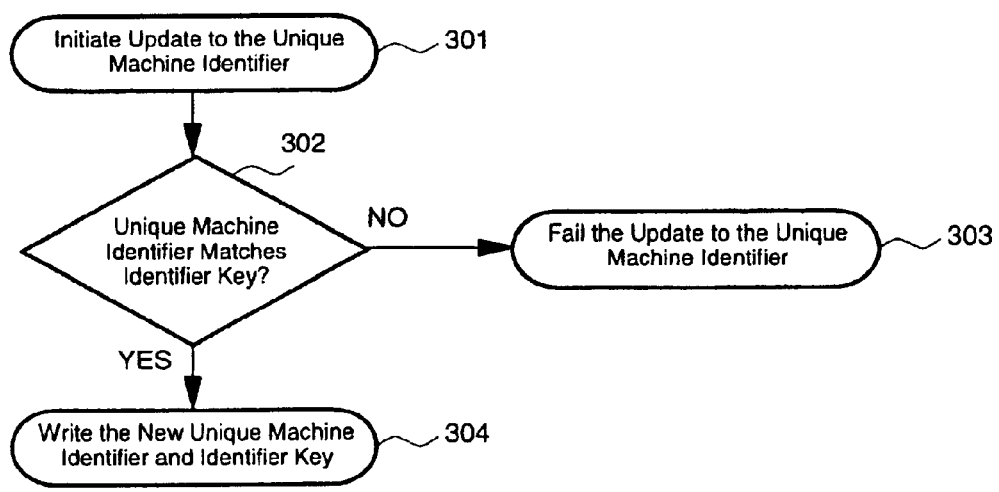
FIG. 5 is a flow chart depicting updating an unique machine identifier of FIG. 2.

If the unique machine identifier 111 of FIG. 2 is not fixed, but, for example, is retained in the nonvolatile memory 104 of FIG. 1, and may be altered, FIG. 5 allows checking of the unique machine identifier when an attempt is made to change it. An update to the unique machine identifier is initiated in step 301. The update comprises a new unique machine identifier and a corresponding identifier key. The update may be delivered through an operator interface or other interface, such as I/O interface 105. Further, another embedded device or computer may deliver the update through I/O interface 105, or an operator may use a diagnostic tool or firmware update process to deliver the update through I/O interface 105. Still further, the update may be delivered through removable storage media, such as magnetic or optical tape, magnetic or optical disk, electronic memory, etc.

In step 302 of FIG. 5, a check is made to determine if the unique machine identifier matches the corresponding identifier key. This may be a determination related to the old unique machine identifier, or, alternatively, to the new unique machine identifier, or both. A match refers to the final verification step of determining if the identifier key is properly associated with the unique machine identifier. For example, the identifier key and/or unique machine identifier may be processed as discussed above with respect to an update. A result that indicates that the identifier key is associated with the unique machine identifier may be considered a match. If the unique machine identifier matches the corresponding identifier key, as indicated in step 302, control moves to step 304, where the new unique machine identifier and the identifier key are written to a nonvolatile memory, such as nonvolatile memory 104 of FIG. 1. Alternatively, if future checks of upgrades will not use an internally stored identifier key, for example, if the authentication of an upgrade is conducted in response to an upgrade command, or a validity check command, the identifier key may be supplied with the command, as discussed above, and need not be stored in non-volatile memory.

If, in FIG. 5, step 302 indicates that the unique machine identifier does not match the corresponding identifier key, control moves to step 303 where the unique machine identifier update operation is failed. A failure means that the new unique machine identifier is not written to the nonvolatile memory 104 of FIG. 1.

The upgrade may apply to more than one embedded device, or more than one potential feature or upgrade may be present for potential upgrade action.

Figure 6:
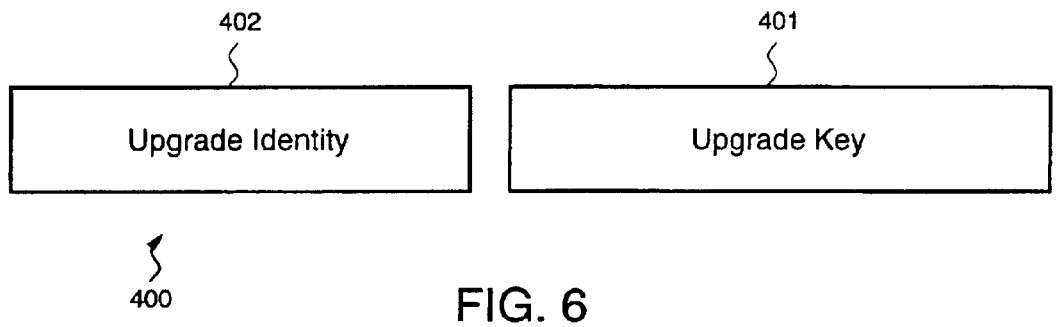
FIG. 6 is a diagrammatic illustration of an embodiment of an upgrade key in accordance with the present invention.

Referring to FIG. 6, an embodiment of an upgrade key and identity 400 is illustrated in which the upgrade key 401 is associated with an identified upgrade, the upgrade identified, for example, with an identity 402. The key 401 is referred to herein as an upgrade key to differentiate it from the identifier key 120 of FIG. 3, which does not necessarily identify the upgrade.

As above, the upgrade key 401 is associated with the unique machine identifier 111 of FIG. 2 discussed above, to provide authentication of the identified upgrade. Also as above, the encryption of the upgrade key 401 and/or unique machine identifier 111 may comprise a compliment of each byte of the unique machine identifier 111, or employ a translation or an encryption algorithm. Still alternatively, the encryption may be a duplicate of the unique machine identifier 111, addressed in such a way that it is not readily available to a potential user of the embedded device. The upgrade key 401 and/or identity 402 may be maintained in a nonvolatile memory-to-authenticate the upgrade, for example, each time that the embedded device is powered on or reset, or alternatively may only be supplied with a command to activate the upgrade, or a validity check command, and need not be maintained in a nonvolatile memory.

As with respect to the identifier key 120 of FIG. 3, the self-authentication by the embedded device employing the authentication upgrade key 401 of FIG. 6 is intended, for example, to prevent accidental or unauthorized enabling of upgrades or features. In this vein, a more complicated encryption improves the ability to prevent an unauthorized user from enabling an upgrade or enhancement. Also, as above, the upgrade key 401 is intended for the authentication of "upgrades" in the same generic sense as defined above.

As discussed above, upgrades also may comprise functional downgrades. Thus, one upgrade key 401 may be employed to enable an upgrade, and a second key 401 is used to disable the upgrade or enhancement. One example of a reason for disabling an upgrade may comprise a manufacturing test which is run with the upgrade enabled, to ensure that the upgrade functionality works. When the manufacturing test is completed, it may be desirable to remove the upgrade until a customer decides to upgrade the embedded device at a later date. The upgrade and downgrade keys may be similar or they may be quite different. For example, a complex key may be employed to enable an upgrade or enhancement, but disabling the upgrade or enhancement may not be as secure because someone is less likely to steal a downgrade in functionality. Further, using separate algorithms for the two keys may enhance the overall security of the upgrade key. The upgrade key may comprise the upgrade identity 402. This would protect the upgrade identity with the same encryption/decryption as the upgrade key. Alternatively, the same, or a different algorithm, or no algorithm, is employed to process each of the upgrade key 401 or the upgrade identity 402, dependent on the encryption state, if any, of each, as will be discussed.

Figure 7A:
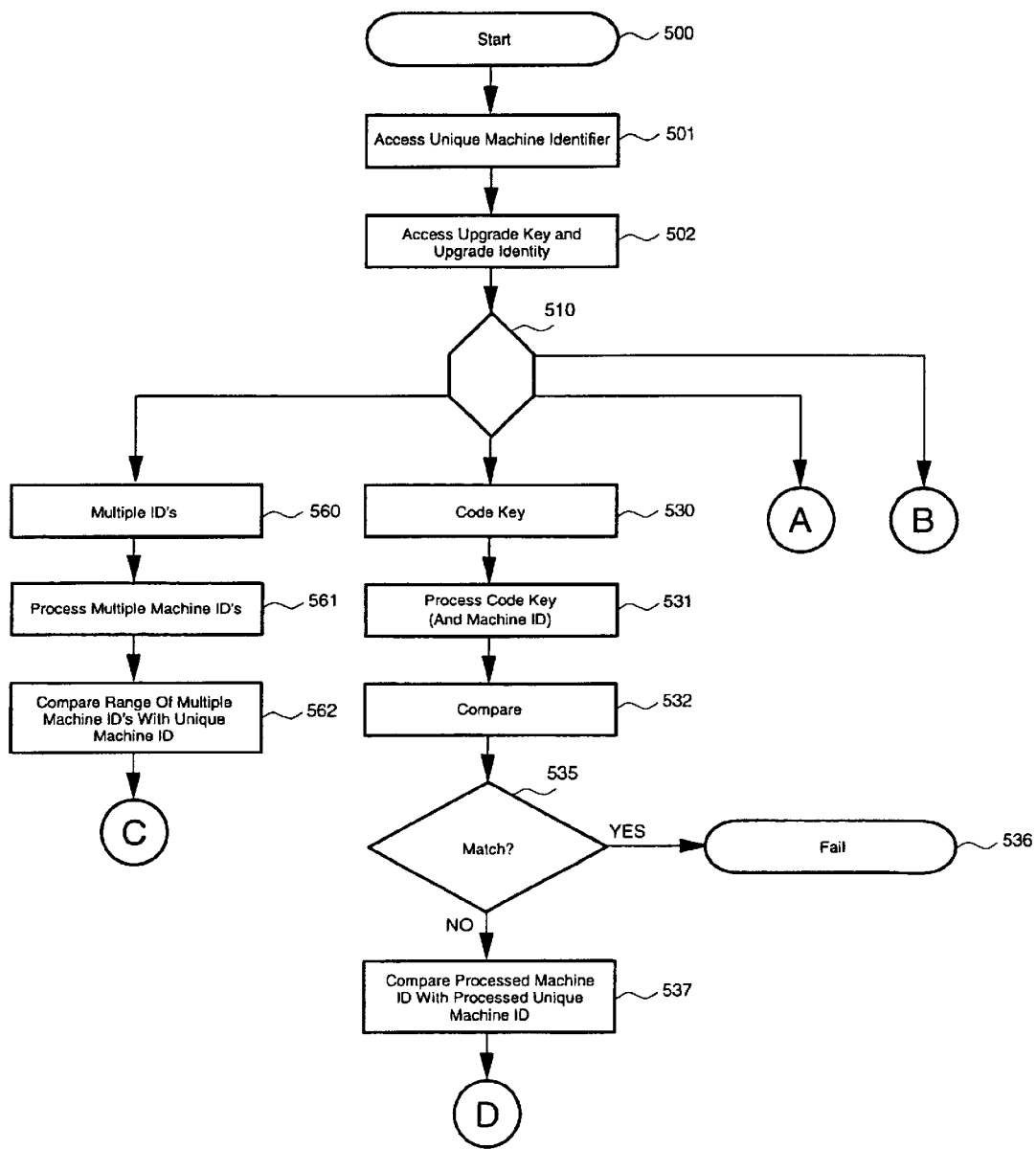
FIGS. 7A, 7B and 7C are a flow chart depicting embodiments of the present invention for authenticating an upgrade to the computer readable program code of the target embedded device of FIG. 1.
Figure 7B:
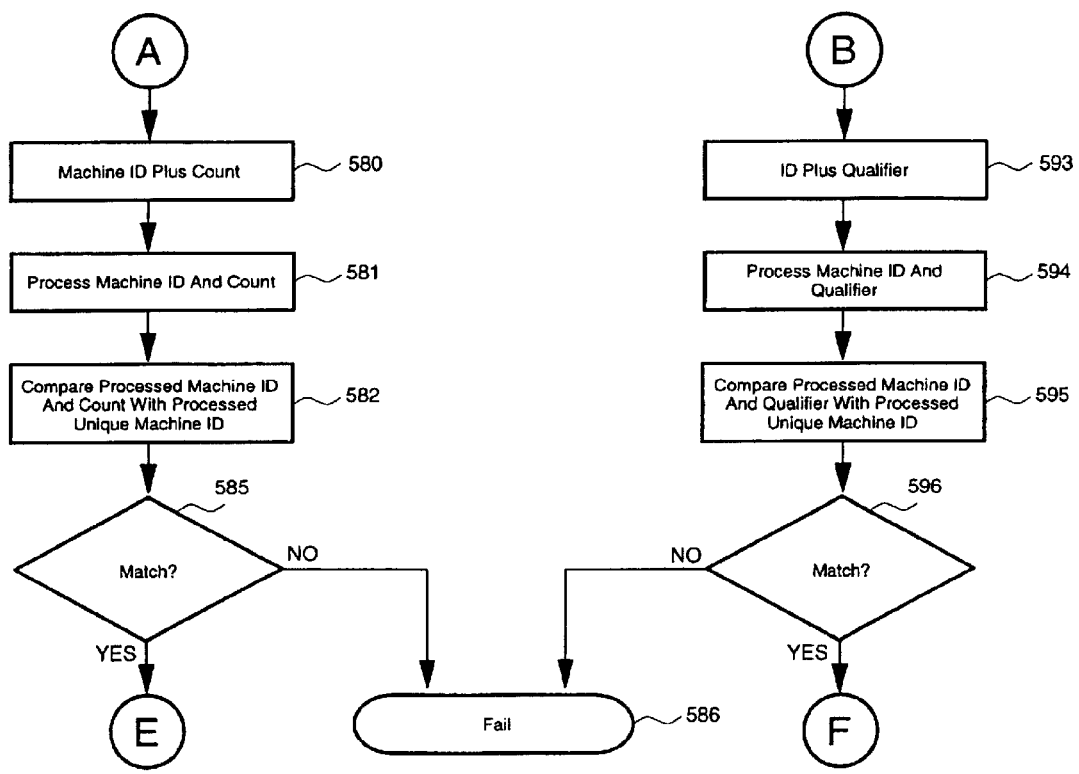
Figure 7C:
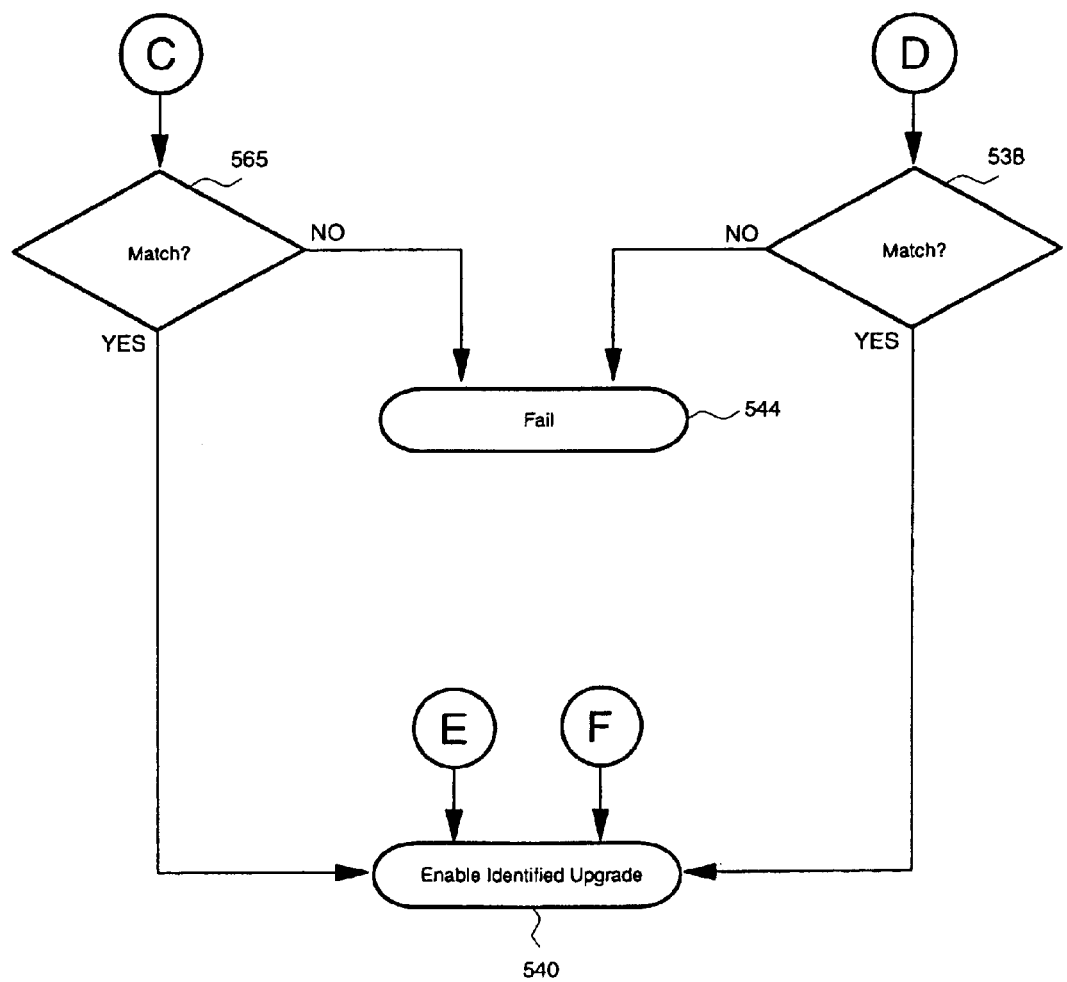

The upgrade key 401 may be a simple key such as key 120 of FIG. 1, or may be more complicated. FIGS. 7A, 7B and 7C, illustrate various alternative processes for authenticating upgrades employing examples of complicated upgrades and/or upgrade keys. The alternative processes may be arranged in series for authenticating upgrade keys that implement combinations of complicated upgrades and/or keys. The embedded device may incorporate any or all alternatives, or, if only one alternative is likely to be used to provide or enable the upgrade, only that alternative process may be implemented.

In FIGS. 7A, 7B and 7C, "START" step 500 represents a power-on, a reset, or a command, such as discussed above, for initiating the authentication. In step 501, the authentication computer readable program code causes the computer processor to access the unique machine identifier, and, in step 502, causes the computer processor to access an upgrade key and the identity of the associated identified upgrade. In step 510, the authentication computer readable program code causes the computer processor to process the upgrade key and/or unique machine identifier; to compare the processed upgrade key with the processed unique machine identifier; and causes the computer processor, if the processed upgrade key matches the processed unique machine identifier, to enable the identified upgrade; else, to fail the identified upgrade. The process may be essentially the same as that of FIG. 4, or, if a complicated upgrade key is provided, step 510 selects the more complicated authentication process or selects a combination of processes. If only one process is available, the selection by step 510 may be omitted.

Figure 8:
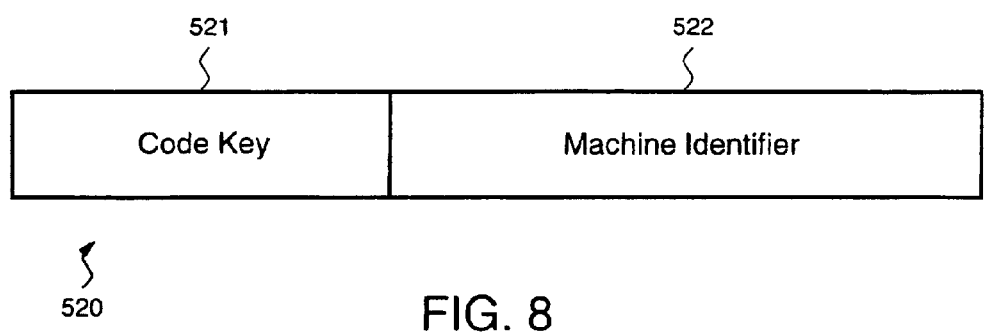
FIGS. 8–18 are diagrammatic illustrations of embodiments of upgrade keys of FIG. 6.

Referring additionally to FIG. 8, an embodiment of an upgrade key 520 is illustrated which comprises a code key 521 and a machine identifier 522. In this embodiment, the code key 521 is translated, coded or encrypted data, or unencrypted data that, when correctly processed by translating, decoding or decrypting, or left unchanged, will authenticate the machine identifier 522, which also may be processed, as may the unique machine identifier. Thus, the code key 521 is used for authentication of the upgrade key 520, and the machine identifier 522 is used for authentication and/or association of a particular target embedded device.

Thus, in FIGS. 7A, 7B, 7C and 8, the code key process is entered at step 530. In step 531, the code key 521 is processed, and, if the machine identifier is encrypted and is to be employed for further authentication, it is also processed by the same or by a different algorithm in step 531, as may be the unique machine identifier 111. In step 532, the desired comparisons are made. In one example, the processed code key 521 is compared to the processed unique machine identifier 111 of FIG. 2. In another example, the processed code key 521 is compared to the processed machine identifier 522 of FIG. 8. The computer readable program code of the embedded device 100 of FIG. 1, causes the computer processor 102, in step 535 of FIGS. 7A, 7B and 7C to determine whether the compared processed code key 521 of FIG. 8 matches the processed unique machine identifier 111 and/or machine identifier 522. If, in step 535, the computer processor determines that the processed code key matches the compared identifier, the computer processor may enable the identified upgrade, else, if the processed code key does not match, it fails the upgrade in step 536, as discussed above with respect to step 155 of FIG. 4. Alternatively, in optional step 537, if step 532 comprised matching the processed code key 521 with the machine identifier 522, the machine identifier 522 (as processed in step 531 if the machine identifier was to be processed) is compared to the processed unique machine identifier 111 of FIG. 2. Step 538 determines whether the processed machine identifier matches the processed unique machine identifier, and, if they match, the computer processor enables the identified upgrade in step 540, else, fails the upgrade in step 544. As above, the code key, machine identifier, and unique machine identifier may be subject to an error recovery process, such as discussed above with respect to steps 160–164 of FIG. 4.

Figure 9:
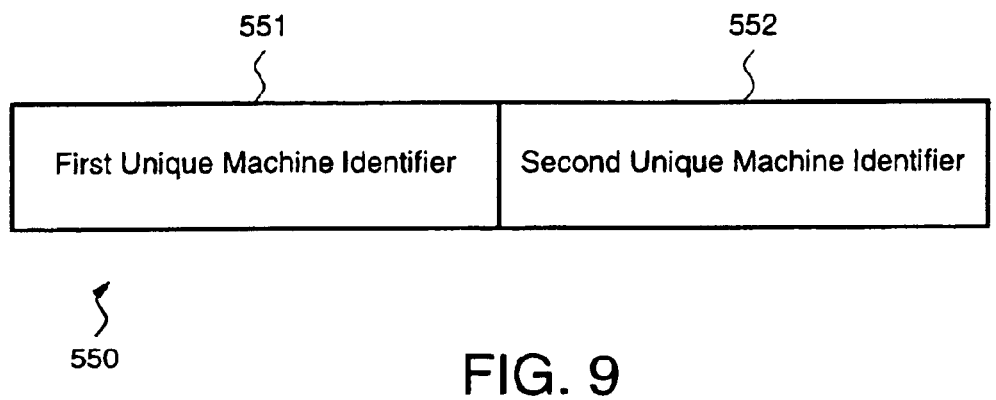

An alternative type of upgrade key 550 is illustrated in FIG. 9, which comprises a plurality of machine identifiers. In the example of FIG. 9, there is an association to a first machine identifier 551 and a second machine identifier 552. The machine identifiers establish a range which may be associated with the unique machine identifier 111 of FIG. 2, and either or both of the machine identifiers may be encrypted by translation, etc., as discussed above, to form the upgrade key. Either or neither of the machine identifiers 551, 552 of FIG. 9 may instead be a direct representation of an unique machine identifier or an encrypted unique machine identifier. The first machine identifier 551 indicates the first unique machine identifier in the range, and the second machine identifier 552 indicates the last unique machine identifier in the range. Thus, a single upgrade key can be used to upgrade a range of unique machine identifiers, and therefore a plurality of embedded devices. This simplifies the key generation and distribution process significantly. For example, manufacturing, development, a distributor, or a customer, may upgrade a large number of embedded devices. This would otherwise require a large number of upgrade keys, but this embodiment could reduce the process to a single upgrade key.

Referring to FIGS. 7A, 7B, 7C and 9, the multiple identifier key process is entered at step 560. In step 561, at least one of the machine identifiers 551, 552 is processed. This means that one or both of the machine identifiers may be encrypted, and thus, the same, or a different algorithm, or no algorithm, is employed to decrypt or leave unchanged, each of the machine identifiers, dependent upon the processing, if any, of each of the machine identifiers in step 561. In step 562, the processed unique machine identifier 111 of FIG. 2 is compared to the range of machine identifiers. The computer readable program code of the embedded device 100 of FIG. 1, causes the computer processor 102, in step 565 of FIGS. 7A, 7B and 7C, to determine whether the compared unique machine identifier matches, that is, is within the range between machine identifier 551 and machine identifier 552 of FIG. 9. If, in step 565 of FIGS. 7A, 7B, and 7C, the computer processor determines that the unique machine identifier is within the range defined by the machine identifiers, and therefore "matches", the computer processor enables the identified upgrade in step 540, else, if the compared identifiers do not match, the computer processor fails the upgrade in step 544. As above, the machine identifiers 551, 552 of FIG. 9, and unique machine identifier 111 of FIG. 2 may be subject to an error recovery process, such as discussed above with respect to steps 160–164 of FIG. 4. Alternatively, FIG. 9 may represent a list of machine identifiers and the list could be fixed or variable in length. The unique machine identifier 111 of FIG. 2 is compared to the machine identifiers in the list of FIG. 9 for a match. In this case, "range" refers to one of the machine identifiers in the list.

Figure 10:
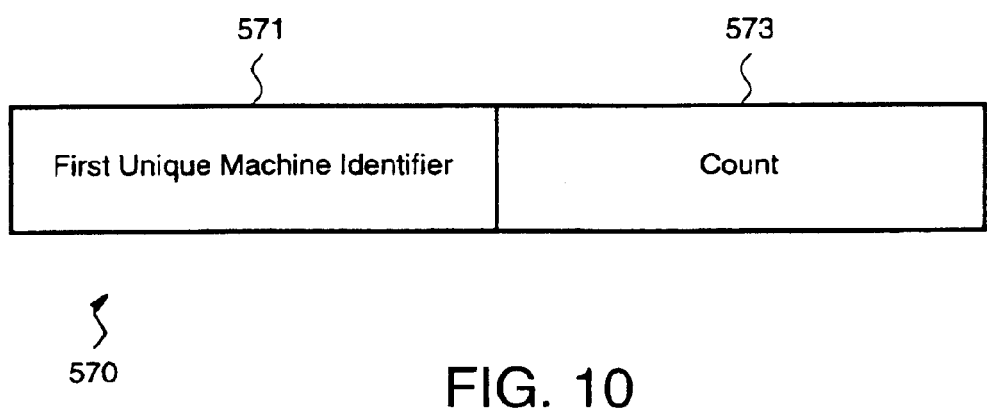

An alternative type of upgrade key 570 which also defines a range is illustrated in FIG. 10, which comprises an association to a first machine identifier 571 and a count 573. The first machine identifier indicates the beginning of the range, and the count indicates how many preceding or subsequent unique machine identifiers 111 of FIG. 2 the key should apply to. Either or both the machine identifier and/or the count of FIG. 10, or none, may be encrypted by translation, etc., to form the upgrade key, as discussed above. Thus, a single upgrade key can be used to upgrade a range of unique machine identifiers, and therefore a plurality of embedded devices.

Referring to FIGS. 7A, 7B, 7C and 10, the machine identifier and count key process is entered at step 580. In step 581, the same, or a different algorithm, or no algorithm, is employed to process each of the machine identifier 571 or the count 573, dependent upon the encryption state, if any, of each. In step 582, the processed unique machine identifier 111 of FIG. 2 is compared to the range of machine identifiers identified by the processed machine identifier and count. The count 573 of FIG. 10 may be added to, or subtracted from, the first machine identifier 571 to calculate a second machine identifier to define the range of unique machine identifiers. The computer readable program code of the embedded device 100 of FIG. 1, causes the computer processor 102, in step 585 of FIGS. 7A, 7B and 7C, to determine whether the compared processed unique machine identifier matches, that is, is within the range defined by the machine identifier 571 and the count 573 of FIG. 10. If, in step 585 of FIGS. 7A, 7B and 7C, the computer processor determines that the unique machine identifier is within the range defined by the machine identifier and the count, and therefore "matches", the computer processor enables the identified upgrade in step 540, else, if the compared identifier and range do not match, the computer processor fails the upgrade in step 586. As above, the machine identifier 571, the count 573 of FIG. 10, and unique machine identifier 111 of FIG. 2 may be subject to an error recovery process, such as discussed above with respect to steps 160–164 of FIG. 4.

Figure 11:
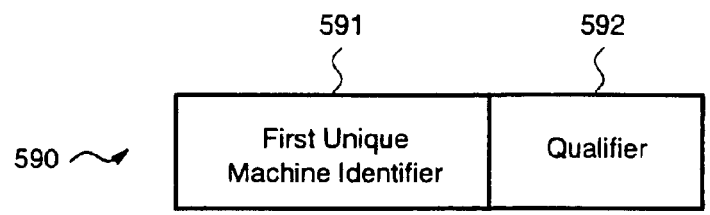

A further alternative type of upgrade key 590 is illustrated in FIG. 11, which comprises a first machine identifier 591 and a qualifier 592. The qualifier is a set of values that represent unique machine identifiers, for example, as offsets or intermediate ranges from the first machine identifier. These values may be discrete numbers or different bits in a string. In the case of bits, each bit position may correspond to a particular offset. This embodiment has the benefit of selecting multiple individual embedded devices to upgrade using a single upgrade key. As discussed above, the upgrade key may comprise a binary or similar representation of machine numbers and of the qualifier, or it may be translated, coded or encrypted data that comprises the unique machine identifier and qualifier. The combination of the first machine identifier and the qualifier values indicates the unique machine identifiers 111 of FIG. 2 the key should apply to.

Referring to FIGS. 7A, 7B, 7C and 11, the machine identifier and qualifier process is entered at step 593. In step 594, the same, or a different algorithm, or no algorithm, is employed to process each of the machine identifier 591 or the qualifier 592, dependent upon the encryption state, if any, of each. The processing may alternatively comprise a decoding of the qualifier with respect to the first machine identifier. In step 595, the processed unique machine identifier 111 of FIG. 2 is compared to the machine identifier identified by the processed and decoded first machine identifier and qualifier. The computer readable program code of the embedded device 100 of FIG. 1, causes the computer processor 102, in step 596 of FIGS. 7A, 7B and 7C, to determine whether the compared processed unique machine identifier matches the decoded first machine identifier 591 and qualifier 592 of FIG. 11. If, in step 596 of FIGS. 7A, 7B and 7C, the computer processor determines that the unique machine identifier matches the decoded first machine identifier and qualifier, the computer processor enables the identified upgrade in step 540, else, if the compared identifier does not match, the computer processor fails the upgrade in step 586. As above, the machine identifier 591, the qualifier 592 of FIG. 11, and unique machine identifier 111 of FIG. 2 may be subject to an error recovery process, such as discussed above with respect to steps 160–164 of FIG. 4.

Figure 12:
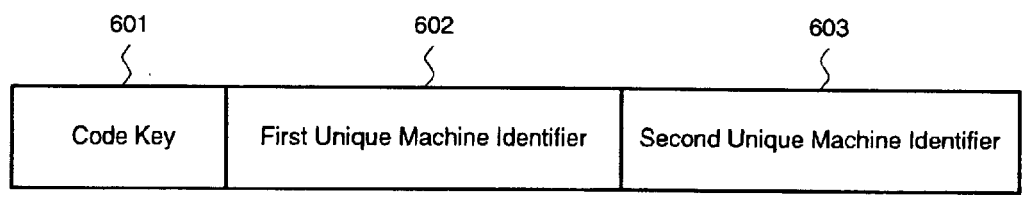
Figure 13:
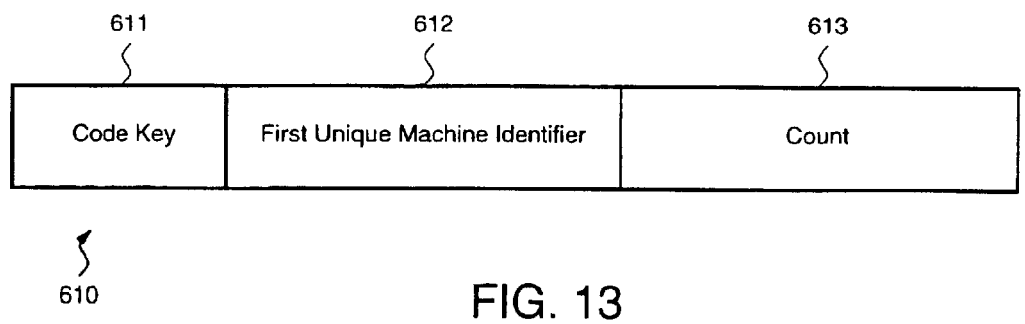

FIGS. 12 and 13 illustrate further embodiments of upgrade keys of FIG. 6. FIG. 12 represents an embodiment of an upgrade key 600 which comprises a code key 601, a first machine identifier 602, and a second machine identifier 603. The machine identifiers 602, 603 define a range of machine identifiers. Alternatively, there are two or more machine identifiers 602, 603 in a list that define individual machine identifiers. FIG. 13 represents an embodiment of an upgrade key 610 which comprises a code key 611, a first machine identifier 612, and a count 613. The count 613 indirectly defines a second machine identifier and thereby defines a range of machine identifiers, for example, by indicating how many preceding or subsequent unique machine identifiers the key should apply to. In FIGS. 12 and 13, the code key 601, 611 may be translated, coded or encrypted data that, when correctly translated, decoded or decrypted, or left unchanged, will authorize the given unique machine identifiers 602, 603, 612 and count 613. In other words, the code key is used for authentication of the upgrade key 600, 610, while the unique machine identifiers and count are used for authentication or association of particular embedded devices 100 of FIG. 1. The upgrade keys 600, 610 of FIGS. 12 and 13 employ, in FIGS. 7A, 7B and 7C, combinations of the code key 530, multiple identifiers 560, and machine identifier and count 580 processes by the embedded devices to self-authenticate the upgrade keys.

Figure 14:
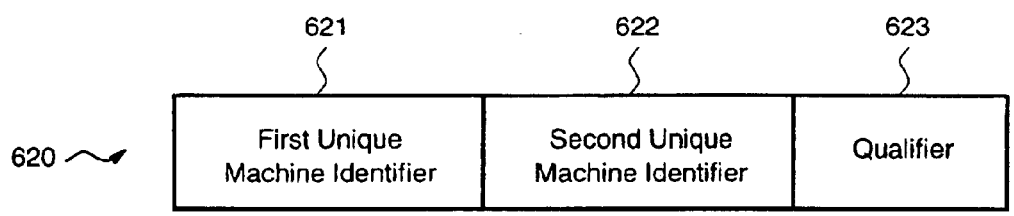
Figure 15:
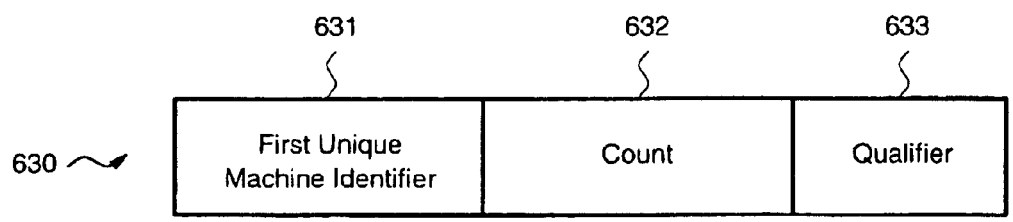

FIGS. 14 and 15 illustrate further embodiments of upgrade keys of FIG. 6, in which a qualifier is employed. FIG. 14 represents an embodiment of an upgrade key 620 which comprises a first machine identifier 621, a second machine identifier 622, and a qualifier 623. The machine identifiers 621, 622 define a range of machine identifiers, and the qualifier 623 identifies individual unique machine identifiers within the range. In other words, the qualifier allows breaks in the range. FIG. 15 represents an embodiment of an upgrade key 630 which comprises a first machine identifier 631, a count 632, and a qualifier 633. The count 633 indirectly defines a second machine identifier and thereby defines a range of machine identifiers, for example, by indicating how many preceding or subsequent unique machine identifiers the key should apply to. The qualifier 633 identifies individual unique machine identifiers within the range, in effect allowing breaks in the range. In FIGS. 14 and 15, all or part of the upgrade key 620, 630 may be translated, coded or encrypted data that, when correctly translated, decoded or decrypted, or left unchanged, will authorize the given unique machine identifiers 621, 622, 631 and count 632, and the qualifier 623, 633 used for authentication or association of particular embedded devices 100 of FIG. 1. The upgrade keys 620, 630 of FIGS. 14 and 15 employ, in FIGS. 7A, 7B and 7C, combinations of the multiple identifiers 560, machine identifier and count 580, and identifier and qualifier 593 processes by the embedded devices to self-authenticate the upgrade keys.

One example where a second unique machine identifier or a count may be desired, along with the qualifier is where it is desired to be able to update a very large range of embedded devices in one case and upgrade a few select embedded devices in another case, all with a single design and a single key.

Figure 16:
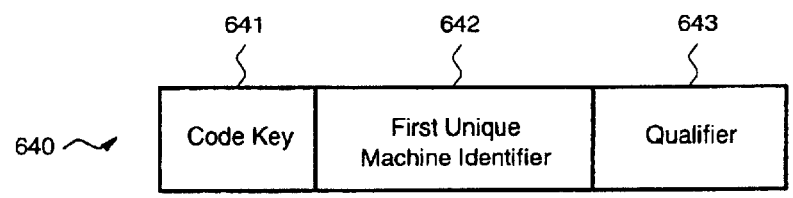
Figure 17:
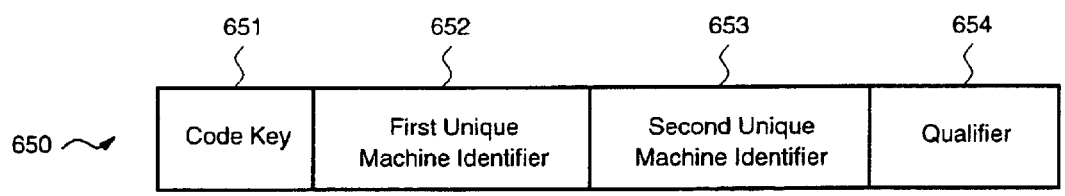
Figure 18:
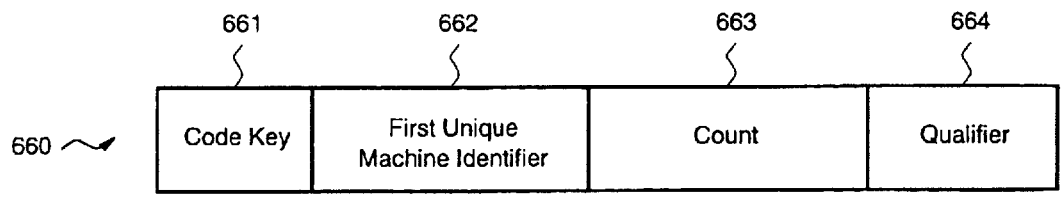

FIGS. 16, 17 and 18 illustrate further embodiments of upgrade keys of FIG. 6, in which both a code key and a qualifier are illustrated. FIG. 16 represents an embodiment of an upgrade key 640 which comprises a code key 641, a first machine identifier 642, and a qualifier 643. As discussed above, the qualifier is a set of values that represent unique machine identifiers, for example, as offsets or intermediate ranges from the first machine identifier. The combination of the first machine identifier and the qualifier values indicates the unique machine identifiers 111 of FIG. 2 the key should apply to. FIG. 17 represents an embodiment of an upgrade key 650 which comprises a code key 651, a first machine identifier 652, a second machine identifier 653, and a qualifier 654. The machine identifiers 652, 653 define a range of machine identifiers, and the qualifier 654 identifies individual unique machine identifiers within the range, allowing breaks in the range. Alternatively, there are two or more machine identifiers 652, 653 in a list that define individual machine identifiers. FIG. 18 represents an embodiment of an upgrade key 660 which comprises a code key 661, a first machine identifier 662, a count 663, and a qualifier 664. The count 663 indirectly defines a second machine identifier and thereby defines a range of machine identifiers, for example, by indicating how many preceding or subsequent unique machine identifiers the key should apply to. The qualifier 664 identifies individual unique machine identifiers within the range, in effect allowing breaks in the range.

In FIGS. 16, 17 and 18, the code key 641, 651, 661 may be translated, coded or encrypted data that, when correctly translated, decoded or decrypted, or left unchanged, will authorize the given unique machine identifiers 642, 652, 653, 662, count 663, and qualifiers 643, 654, 664. In other words, the code key is used for authentication of the upgrade key 640, 650, 660 while the unique machine identifiers and count are used for authentication or association of particular embedded devices 100 of FIG. 1. The upgrade keys 640, 650, 660 of FIGS. 16, 17 and 18 employ, in FIGS. 7A, 7B and 7C, combinations of the code key 530, multiple identifiers 560, machine identifier and count 580, and machine identifier and qualifier 593 processes by the embedded devices to self-authenticate the upgrade keys.

FIG. 19 illustrates an example of an upgrade key 690, similar to upgrade key 590 of FIG. 11, having a first machine identifier 691 and a qualifier 692. As discussed above, the qualifier is a set of values that represent unique machine identifiers, for example, as offsets or intermediate ranges from the first machine identifier. The values shown are not necessarily in the form that the values may be present in an actual upgrade key. For example, the key may be translated, compressed or encrypted data, and the values of the first machine identifier 691 and a qualifier 692 may be the translated, uncompressed or decrypted values. The upgrade key 690 comprises a machine identifier 691 that comprises a value of "1310121" and a qualifier 692 that comprises a value of "139". In this example, the value of "139" is given in decimal, which means that the equivalent hexadecimal value is "8B" and the binary value is "10001011".

FIG. 20 represents a breakdown of the qualifier 692 of FIG. 19. In FIG. 20, a string of individual binary digits, or bits, are used to indicate intermediate or additional unique machine identifiers to include in the key. Other embodiments may be employed, such as a string of bytes, or some other unit of memory may alternatively employed, as is understood by those of skill in the art. This example employs a string of eight bits, and those of skill in the art understand that different numbers of bits may be used.

In the example of FIGS. 19 and 20, first machine identifier 691 comprises a value of "1310121", and each bit in the qualifier 692 identifies whether or not the next unique machine identifier, in a sequence, is considered part of the upgrade key. For example, the binary digit 701 contains a value of "0" which means that unique machine identifier "1310122" is not included in the upgrade key, whereas binary digits 700, 704, 706 and 707 contain values of "1" to indicate that the respective unique machine identifiers are included in the upgrade key, such as binary digit 704 indicating that unique machine identifier "1310125" is included in the upgrade key.

FIG. 21 illustrates a table that may be built by the identifier and qualifier process 593 of FIGS. 7A, 7B and 7C in an embedded device to indicate the unique machine identifiers that would be included in the upgrade key, for comparison to the processed unique machine identifier of the embedded device conducting the process. The table of FIG. 21 illustrates the values of the first machine identifier 691 and the qualifier 692 of FIGS. 19 and 20. In FIG. 21, for example, bit 700 indicates the inclusion of the unique machine identifier 691, based on the bit values of qualifier 692 of FIG. 20.

Alternatively, since the first unique machine identifier 691 is provided in the key 690 of FIG. 19, the first bit in the qualifier 692 of FIG. 20 may instead refer to the next unique machine identifier in the sequence, as illustrated in FIG. 22. Thus, in FIG. 22, the first entry in the table is the unique machine identifier 691 and the rest of the table is based on bit values of the qualifier 692 of FIG. 20, such as bit value 700.

Referring to FIGS. 14, 15, 17, 18, 19, 20, 21 and 22, as discussed above, one example where a second unique machine identifier or a count may be desired, along with the qualifier is where it is desired to be able to update a very large range of embedded devices in one case and upgrade a few select embedded devices in another case, all with a single design and a single key. The qualifier may limit the number of embedded devices that can be upgraded with one key. For example, it may be desired to produce a single key that will upgrade all embedded devices that fall within a unique machine identifier range of "1330554" and "1330903". Later, it may be desired to use a single key that will only upgrade embedded devices "1310121", "1310125", "1310127" and "1310128", which can be accomplished, for example, with the upgrade key 620 of FIG. 14. Using the example of FIG. 14 with a qualifier 692 of FIGS. 20 and 21, the indicator that all unique machine identifiers should be upgraded would occur when all bit values equal a value of one. In this example, if the qualifier 623 of FIG. 14 contains a value of "FF" hexadecimal, then all embedded devices that contain an unique machine identifier in the range of the first unique machine identifier 621 and the second unique machine identifier 622 would be upgraded with the upgrade key 620. If the qualifier 623 contains any other values, then the rules of the qualifier prevail, omitting ones of the embedded devices from the upgrade. This later upgrade could also be conducted with an upgrade key 590 of FIG. 11 with a single first unique machine identifier 591 and a qualifier 592. Specifically, a variable length qualifier allows an almost limitless upgrade key that could target individual embedded devices within any range after the first unique machine identifier. The variable length qualifier could have an associated length, termination indicator, or simply end-of-data, to indicate the length or size of the qualifier.

Another example where the second unique machine identifier or count may be helpful in an upgrade key that also contains a qualifier, is the case where the qualifier contains a value of 00 hexadecimal. In this case, only embedded devices that contain a unique machine identifier that matches the first unique machine identifier, such as identifier 621 of upgrade key 620 of FIG. 14, or the second unique machine identifier, such as identifier 622, would be upgraded, even though the first unique machine identifier 621 and second unique machine identifier 622 may span a range that is greater than the qualifier.

The illustrated components of the embedded device 100 of FIG. 1, and the arrangement of the process steps of FIGS. 4, 5, 7A, 7B and 7C may be varied, combined, or combined functions may be separated, as is known to those of skill in the art. Further, the illustrated steps of FIGS. 4, 5, 7A, 7B and 7C may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. An embedded device, comprising:
   a computer processor;
   at least one element operated by said computer processor;
   a unique machine identifier; and
   a memory storing computer readable program code for operating said computer processor, and for authenticating an upgrade to said computer readable program code, said computer readable program code comprising:
   computer readable program code causing said computer processor to access said unique machine identifier;
   computer readable program code causing said computer processor to access an identifier key associated with said upgrade;
   computer readable program code causing said computer processor to process said accessed identifier key and/or and said accessed unique machine identifier;
   computer readable program code causing said computer processor to compare said processed identifier key with said processed unique machine identifier in the same process space; and
   computer readable program code causing said computer processor, if said processed identifier key matches said processed unique machine identifier, to enable said upgrade; else, to fail said upgrade.

2. The embedded device of claim 1, wherein said computer readable program code of said memory which causes said computer processor to enable said upgrade, causes said computer processor to set an enabling flag for said upgrade.

3. The embedded device of claim 1, wherein said computer readable program code of said memory which causes said computer processor to enable said upgrade, causes said computer processor to store said identifier key and/or said processed identifier key.

4. The embedded device of claim 1, wherein said computer processor is responsive to a power-on and/or reset to initiate said upgrade authentication, and wherein said computer readable program code of said memory which causes said computer processor to enable said upgrade, causes said computer processor, if said processed identifier key matches said processed unique machine identifier, to initialize said embedded device normally with said upgrade enabled; else, to initialize said embedded device without said upgrade.

5. The embedded device of claim 1, additionally comprising an input, and wherein said computer readable program code of said memory, additionally causes said computer processor to respond to an upgrade command received at said input, and initiate said upgrade authentication.

6. The embedded device of claim 1, wherein said computer readable code of said memory, additionally comprises computer readable code causing said computer processor, if said processed identifier key fails to match said processed unique machine identifier, to conduct at least one error recovery procedure on said unique machine identifier and/or identifier key; to again compare said processed identifier key with said processed unique machine identifier; and, if said processed identifier key matches said processed unique machine identifier, to enable said upgrade; else, to fail said upgrade.

7. The embedded device of claim 1, wherein:
   said computer readable program code of said memory which causes said computer processor to access an identifier key associated with said upgrade, causes said computer processor to access an upgrade key associated with an identified upgrade;
   said computer readable program code of said memory which causes said computer processor to process said identifier key, causes said computer processor to process said upgrade key;
   said computer readable program code of said memory which causes said computer processor to compare said processed identifier key with said processed unique machine identifier, causes said computer processor to compare said processed upgrade key with said processed unique machine identifier; and
   said computer readable program code of said memory which causes said computer processor to enable said upgrade and, else, to fail said upgrade, causes said computer processor, if said processed upgrade key matches said processed unique machine identifier, to enable said identified upgrade; else, to fail said identified upgrade.

8. The embedded device of claim 7, wherein said upgrade key comprises a code key and a machine identifier, and wherein:
   said computer readable program code of said memory which causes said computer processor to process said upgrade key, causes said computer processor to process said code key; and
   said computer readable program code of said memory which causes said computer processor to compare said processed upgrade key with said processed unique machine identifier, causes said computer processor to compare said processed code key with said processed machine identifier and/or said processed unique machine identifier.

9. The embedded device of claim 7, wherein said upgrade key comprises a plurality of upgrade machine identifiers, and wherein:

said computer readable program code of said memory which causes said computer processor to process said upgrade key, causes said computer processor to process said plurality of upgrade machine identifiers; and said computer readable program code of said memory which causes said computer processor to compare said processed upgrade key with said processed unique machine identifier, causes said computer processor to compare said processed plurality of upgrade machine identifiers with said processed unique machine identifier, said comparison indicated as matched if said processed unique machine identifier is within a range between said processed plurality of upgrade machine identifiers.

10. The embedded-device of claim 7, wherein said upgrade key comprises an upgrade machine identifier and a count, and wherein:

said computer readable program code of said memory which causes said computer processor to process said upgrade key, causes said computer processor to process said upgrade machine identifier and/or said count; and said computer readable program code of said memory which causes said computer processor to compare said processed upgrade key with said processed unique machine identifier, causes said computer processor to compare said processed upgrade machine identifier and said count with said processed unique machine identifier, said comparison indicated as matched if said processed unique machine identifier is within a range between said processed upgrade machine identifier and a sum of said processed upgrade machine identifier and said count.

11. The embedded device of claim 7, wherein said upgrade key comprises an upgrade machine identifier and a qualifier, and wherein:

said computer readable program code of said memory which causes said computer processor to process said upgrade key, causes said computer processor to process said upgrade machine identifier and said qualifier; and said computer readable program code of said memory which causes said computer processor to compare said processed upgrade key with said processed unique machine identifier, causes said computer processor to compare said processed upgrade machine identifier and said qualifier with said processed unique machine identifier, said comparison indicated as matched if said processed unique machine identifier matches said processed upgrade machine identifier combined with said qualifier.

12. A method for authenticating an upgrade to computer readable program code of an embedded device, said embedded device comprising a computer processor; at least one element operated by said computer processor; and a memory storing computer readable program code for operating said computer processor, and said computer readable program code for authenticating an upgrade, said method comprising the steps of:

accessing an unique machine identifier of said embedded device;

accessing an identifier key associated with said upgrade;

processing said accessed identifier key and said accessed unique machine identifier;

comparing said processed identifier key with said processed unique machine identifier in the same process space; and if-said processed identifier key matches said processed unique machine identifier, enabling said upgrade; else, failing said upgrade.

13. The method of claim 12, wherein said step of enabling said upgrade, comprises setting an enabling flag for said upgrade.

14. The method of claim 12, wherein said step of enabling said upgrade, comprises storing said identifier key.

15. The method of claim 12, wherein said method additionally comprises the step of responding to a power-on and/or reset of said embedded device, initiating said upgrade authentication; and wherein said step of enabling said upgrade, comprises, if said processed identifier key matches said processed unique machine identifier, initializing said embedded device normally with said upgrade enabled; else, initializing said embedded device without said upgrade.

16. The method of claim 12, wherein said embedded device additionally comprises an input, and wherein said method additionally comprises the step of responding to an upgrade command-received at said input, initiating said upgrade authentication.

17. The method of claim 12, additionally comprising the steps of:

if said processed identifier key fails to match said processed unique machine identifier, conducting at least one error recovery procedure on said unique machine identifier and/or said identifier key;

again comparing said processed identifier key with said processed unique machine identifier; and if said processed identifier key matches said processed unique machine identifier, to enable said upgrade; else, to fail said upgrade.

18. The method of claim 12, wherein:

said step of accessing an identifier key associated with said upgrade, comprises accessing an upgrade key associated with an identified upgrade;

said step of processing said identifier key, comprises processing said upgrade key;

said step of comparing said processed identifier key with said processed unique machine identifier, comprises comparing said processed upgrade key with said processed unique machine identifier; and said step of enabling said upgrade and, else, fail said upgrade, comprises, if said processed upgrade key matches said processed unique machine identifier, enabling said identified upgrade; else, failing said identified upgrade.

19. The method of claim 18, wherein said upgrade key comprises a code key and a machine identifier, and wherein:

said step of processing said upgrade key, comprises processing said code key; and said step of comparing said processed upgrade key with said processed unique machine identifier, comprises comparing said processed code key with said processed machine identifier and/or said processed unique machine identifier.

20. The method of claim 18, wherein said upgrade key comprises a plurality of upgrade machine identifiers, and wherein:

said step of processing said upgrade key, comprises processing said plurality of upgrade machine identifiers; and said step of comparing said processed upgrade key with said processed unique machine identifier, comprises comparing said processed plurality of upgrade machine identifiers with said processed unique machine identifier, said comparison indicated as matched if said processed unique machine identifier is within a range between said-processed plurality of upgrade machine identifiers.

21. The method of claim 18, wherein said upgrade key comprises an upgrade machine identifier and a count, and wherein:
said step of processing said upgrade key, comprises processing said upgrade machine identifier and/or said count; and
said step of comparing said processed upgrade key with said processed unique machine identifier, comprises comparing said processed upgrade machine identifier and said count with said processed unique machine identifier, said comparison indicated as matched if said processed unique machine identifier is within a range between said processed upgrade machine identifier and a sum of said processed upgrade machine identifier and said count.

22. The method of claim 18, wherein said upgrade key comprises an upgrade machine identifier and a qualifier, and wherein:
said step of processing said upgrade key, comprises processing said upgrade machine identifier and said qualifier; and
said step of comparing said processed upgrade key with said processed unique machine identifier, comprises comparing said processed upgrade machine identifier and said qualifier with said processed unique machine identifier, said comparison indicated as matched if said processed unique machine-identifier matches said processed upgrade machine identifier combined with said qualifier.

23. A computer program product of a computer readable medium usable with a computer processor, said computer program product having computer readable program code embodied therein for authenticating an upgrade to an embedded device having a computer processor, at least one element operated by said computer processor, and a unique machine identifier, said computer readable program code comprising:
computer readable program code causing said computer processor to access said unique machine identifier;
computer readable program code causing said computer processor to access an identifier key associated with said upgrade;
computer readable program code causing said computer processor to process said accessed identifier key and said accessed unique machine identifier;
computer readable program code causing said computer processor to compare said processed identifier key with said processed unique machine identifier in the same process space; and
computer readable program code causing said computer processor, if said processed identifier key matches said processed unique machine identifier, to enable said upgrade; else, to fail said upgrade.

24. The computer program product of claim 23, wherein said computer readable program code which causes said computer processor to enable said upgrade, causes said computer processor to set an enabling flag for said upgrade.

25. The computer program product of claim 23, wherein said computer readable program code which causes said computer processor to enable said upgrade, causes said computer processor to store said identifier key and/or said processed identifier key.

26. The computer program product of claim 23, wherein said computer processor is responsive to a power-on and/or reset to initiate said upgrade authentication, and wherein said computer readable program code which causes said computer processor to enable said upgrade, causes said computer processor, if said processed identifier key matches said processed unique machine identifier, to initialize said embedded device normally with said upgrade enabled; else, to initialize said embedded device without said upgrade.

27. The computer program product of claim 23, additionally comprising an input, and wherein said computer readable program code additionally causes said computer processor to respond to an upgrade command received at said input, and initiate said upgrade authentication.

28. The computer program product of claim 23, wherein said computer readable code additionally causes said computer processor, if said processed identifier key fails to match said processed unique machine identifier, to conduct at least one error recovery procedure on said unique machine identifier and/or identifier key; to again compare said processed identifier key with said processed unique machine identifier; and, if said processed identifier key matches said processed unique machine identifier, to enable said upgrade; else, to fail said upgrade.

29. The computer program product of claim 23, wherein:
said computer readable program code which causes said computer processor to access an identifier key associated with said upgrade, causes said computer processor to access an upgrade key associated with an identified upgrade;
said computer readable program code which causes said computer processor to process said identifier key, causes said computer processor to process said upgrade key;
said computer readable program-code which-causes said computer processor to compare said processed identifier key with said processed unique machine identifier, causes said computer processor to compare said processed upgrade key with said processed unique machine identifier; and
said computer readable program code which causes said computer processor to enable said upgrade and, else, to fail said upgrade, causes said computer processor, if said processed upgrade key matches said processed unique machine identifier, to enable said identified upgrade; else, to fail said identified upgrade.

30. The computer program product of claim 29, wherein said upgrade key comprises a code key and a machine identifier, and wherein:
said computer readable program code which causes said computer processor to process said upgrade key, causes said computer processor to process said code key; and
said computer readable program code which causes said computer processor to compare said processed upgrade key with said processed unique machine identifier, causes said computer processor to compare said processed code key with said processed machine identifier and/or said processed unique machine identifier.

31. The computer program product of claim 29, wherein said upgrade key comprises a plurality of upgrade machine identifiers, and wherein:
said computer readable program code which causes said computer processor to process said upgrade key, causes said computer processor to process said plurality of upgrade machine identifiers; and
said computer readable program code which causes said computer processor to compare said processed upgrade key with said processed unique machine identifier, causes said computer processor to compare said processed plurality of upgrade machine identifiers with said processed unique machine identifier, said comparison indicated as matched if said processed unique machine identifier is within a range between said processed plurality of upgrade machine identifiers.

32. The computer program product of claim 29, wherein said upgrade key comprises an upgrade machine identifier and a count, and wherein:

said computer readable program code which causes said computer processor to process said upgrade key, causes said computer processor to process said upgrade machine identifier and/or said count; and said computer readable program code which causes said computer processor to compare said processed upgrade key with said processed unique machine identifier, causes said computer-processor to compare said processed upgrade machine identifier and said count with said processed unique machine identifier, said comparison indicated as matched if said processed unique machine identifier is within a range between said processed upgrade machine identifier and a sum of said processed upgrade machine identifier and said count.

33. The computer program product of claim 29, wherein said upgrade key comprises an upgrade machine identifier and a qualifier, and wherein:

said computer readable program code which causes said computer processor to process said upgrade key, causes said computer processor to process said upgrade machine identifier and said qualifier; and said computer readable program code which causes said computer processor to compare said processed upgrade key with said processed unique machine identifier, causes said computer processor to compare said processed upgrade machine identifier and said qualifier with said processed unique machine identifier, said comparison indicated as matched if said processed unique machine identifier matches said processed upgrade machine identifier combined with said qualifier.

* * * * *

UNITED STATES PATENT AND TRADEMARK OFFICE
CERTIFICATE OF CORRECTION

PATENT NO. : 6,834,347 B2
DATED : December 21, 2004
INVENTOR(S) : Goodman et al.

It is certified that error appears in the above-identified patent and that said Letters Patent is hereby corrected as shown below:

Column 15,
Line 52, delete "and/or"

Column 16,
Lines 2-3, delete "and/or said processed identifier key"

Column 19,
Line 62, delete "and/or said processed identifier key"

Signed and Sealed this

Twenty-eighth Day of June, 2005

JON W. DUDAS
*Director of the United States Patent and Trademark Office*